> United States Patent Office 3,822,236
Patented July 2, 1974

3,822,236
PROCESS FOR PREPARATION OF
CHELATE POLYMERS
Sidney Alan Barker and John Frederick Kennedy, Birmingham, and John Epton, Stourbridge, England, assignors to Aspro-Nicholas Limited, Slough, England
No Drawing. Filed Aug. 18, 1972, Ser. No. 281,855
Claims priority, application Great Britain, Sept. 1, 1971, 40,860/71
Int. Cl. C08f 7/02, 19/00
U.S. Cl. 260—47 UA
11 Claims

ABSTRACT OF THE DISCLOSURE

Ethylenically unsaturated monomers having chelating sites defined by adjacent hydroxy and carboxylic acid groups are polymerised by free-radical techniques with the monomer chelated with a metallic or the like ion and/or in the presence of an alkali, preferably at about pH 9. Examples of chelating ions are titanous and borate ions and examples of polymerised monomers are N-acryloylaminosalicylic acids.

---

The present invention relates to the polymerisation of ethylenically unsaturated monomers having chelating sites defined by one or more pairs of adjacent hydroxy and carboxylic acid groups. The invention provides free-radical polymerisation methods which are particularly suited to said monomers and permit of the free-radical polymerisation of monomers which could not previously be polymerised by this type of polymerisation.

Free-radical polymerisation is known to be inhibited by the presence in the reaction mixture of certain compounds or radicals which degrade the free-radicals into inactive products. It appears from the inventors' investigations that in many instances the presence of adjacent hydroxy and carboxylic acid groups, especially as substituents on an aromatic nucleus, in an ethylenically unsaturated monomer inhibits free-radical polymerisation. Thus, attempts to polymerise N-acryloyl-aminosalicylic acids using conventional free-radical polymerisation techniques have failed. There have been reports however of such conventional techniques being effective in polymerising certain acryloyloxy-methyl derivatives of salicylic acid, (see U.S. Pat. Specification No. 3,290,270) and hence it appears that the extent of the hydroxy/carboxylic acid inhibition varies considerably even between closely related monomers.

The inventors have found that the hydroxy/carboxylic acid inhibition can be considerably reduced, if not eliminated, by either forming a chelate of the monomer with a metallic or the like ion prior to polymerisation or conducting the polymerisation in the presence of an alkali. Both of these novel techniques have proved to be successful in polymerising N-acryloylaminosalicylic acids in the presence of a free-radical initiator.

According to the present invention therefore, there is provided a method of polymerising by free-radical polymerisation an ethylenically unsubstituted monomer having one or more pairs of adjacent hydroxy and carboxylic acid groups defining chelating sites wherein:

(a) the monomer is chelated with a metallic or the like ion, and/or
(b) the polymerisation is conducted in the presence of an alkali. The term "alkali" as used herein has its usual meaning, namely, the hydroxides and carbonates of alkali metals and ammonia as set forth in Hackh's Chemical Dictionary, 4th Edition, published by McGraw-Hill Book Company, New York, N.Y.

The reaction conditions other than these specified above used in the methods of the present invention can be those conventionally employed in free-radical polymerisation and bulk, suspension, solution or emulsion techniques can be employed. For example, a solution of the monomer in a suitable solvent may be heated with a free-radical initiator in a vessel equipped with a reflux condenser or in a sealed vessel. The preferred free-radical initiator is azobisisobutyronitrile but other initiator compounds such as peroxides, persulphates and other azo compounds can be used. Alternatively, the polymerisation can be initiated for example, by irradiating at ambient temperature a solution of the monomer in a suitable solvent and if necessary in the presence of a photosensitizer with free-radical initiating radiation such as ultra-violet light.

The methods of this invention are effective for the production of both homopolymers of the specified class of monomers and copolymers of said monomers with one or more copolymerisable ethylenically unsaturated monomers.

Preferred monomers for polymerisation by the methods of the invention are those in which a pair of adjacent hydroxy and carboxylic acid groups are substituents on adjacent ring carbon atoms of an aromatic nucleus. Such preferred monomers include orthohydroxybenzoic acids having as a ring substituent an ethylenically unsaturated radical, for example of the formula $$-X \cdot (CO)_n \cdot CR = CR_1R_2$$

(wherein each R independently represents hydrogen, alkyl or 1 to 6 carbon atoms or halogen, n represents 0 or 1 and X represents a direct bond, oxygen, sulphur, —NH—, or methylene). Preferred unsaturated radicals are those of the formula —X·(CO)$_n$·CR=CH$_2$ (wherein R represents methyl or, more preferably, hydrogen, n and X are as defined above but preferably n is 1 and X is —NH—). Advantageously, the unsaturated radical is in the four or five position of the phenyl ring.

Examples of preferred monomers for polymerisation by the present invention are the N-acryloylaminosalcylic acids such as N-acryloyl-4-aminosalicylic acid and N-acryloyl-5-aminosalicylic acid. These monomers may be copolymerised with, for example, acrylamide, and additionally or alternatively in the presence of a crosslinking agent such as N-methylene-bis-acrylamide.

In the case where the monomer is polymerised as its chelate, the chelate may be prepared by simply mixing together the monomer and a source of chelating ions in an aqueous medium. Suitable chelating ions include titanous and borate ions, which ions are readily donated by titanous chloride and borax respectively. If desired the chelate can be formed *in situ* immediately prior to free-radical initiation.

In the case where polymerisation is carried out in the presence of an alkali, a suitable alkali such as sodium hydroxide may be added to an aqueous solution or suspension of the monomer before addition of the free-radical initiator. Preferably, sufficient alkali is added to make the reaction mixture alkali, suitably about pH 9. although polymerisation will take place at slightly acid pH values, for example about 4.5. If desired, polymerisation of chelated monomers may be carried out in the presence of alkali. The polymers obtained by the methods of the present invention may be isolated from the reaction product in known manner. For example, polymers soluble in the reaction medium may be precipitated by addition of acid, if desired after dialysis to remove excess chelating ions.

The following are Examples of methods in accordance with the present invention.

EXAMPLE 1

Preparation of N-acryloyl-4-aminosalicylic acid

Sodium 4-aminosalicylate (40 g.) and sodium bicarbonate (60 g.) were dissolved in distilled water (250 ml.) and stirred for 1 hour. Two additions of acryloyl chloride (20 ml. and 10 ml.) were made, the solution being stirred for 1 hour after each addition. The solution thus obtained was made slightly acid (pH 4–5) by addition of 10 $N$ hydrochloric acid, filtered and washed with distilled water (500 ml.).

N-acryloyl-4-aminosalicylic acid was recrystallised from aqueous ethanol in a yield of 27.0 g. This acid has a melting point of 227°–229° C. and analysed as follows:

Calculated.—$C_{10}H_9O_4N$ (percent): C, 58.0; H, 4.35; N, 6.76. Found (percent): C, 57.7; H, 4.35; N, 6.65.

Polymerisation of borate-complexed N-acryloyl-4-aminosalicylic acid

N-acryloyl-4-aminosalicylic acid (15.0 g.) prepared as above and borax (9.36 g.) were dissolved in distilled water (180 ml.) thereby forming a borate chelate with the acid. The pH was adjusted to 9.0 with 10$N$ sodium hydroxide. Azobisisobutyronitrile (150 mg.) in ethanol (50 ml.) was added and the solution heated at 80° C. for 48 hours in a flask fitted with a reflux condenser. The resulting viscous solution was diluted with distilled water (200 ml.) and a white borate-free polymer precipitated as a heavy white floc by adding 5$N$ hydrochloric acid to pH 2. The polymer was washed ten times with 1 l. amounts of distilled water by decantation and then rotary evaporated with methanol to remove any remaining boric acid. The polymer (poly-(N-acryloyl-4-aminosalicylic acid)) was stored as a suspension in distilled water.

To assess the water content of said polymer, a weighed quantity of filtered polymer was dried over phosphorus pentoxide *in vacuo* at 60° C. On drying, a hard brittle brown, translucent solid resulted. The filtered polymer *supra* was calculated to contain 93% by weight of water.

In a modification of the above procedure, the viscous solution resulting from the polymerisation of N-acryloyl-4-aminosalicylic acid (5 g.) was diluted with distilled water (70 ml.) and then dialysed for 48 hours against 10 changes (5 litres each) of 0.0005$M$ borate buffer (pH 7.0) to yield borate-complexed poly(N-acryloyl-4-aminosalicylic acid).

EXAMPLE 2

Polymerisation of borate-complexed N-acryloyl-4-aminosalicylic acid

N-acryloyl-4-aminosalicylic acid (250 mg.) prepared as in Example 1 above and borax (156 mg.) were dissolved in distilled water (3.0 ml.) thereby forming a borate chelate with the acid. The pH was adjusted to 9.0 with 10$N$ sodium hydroxide. Azobisisobutyronitrile (50 mg.) in ethanol (50 ml.) was added and the solution placed in a glass tube, sealed and left at 70° C. in a water bath for 48 hours. The resulting viscous liquid was treated with $N$ hydrochloric acid giving a heavy white floc. The polymer thus precipitated was partially translucent and had a rubber-like texture.

Attempts to polymerise N-acryloyl-4-aminosalicylic acid by free-radical initiation using the following reaction mixtures sealed in a glass tube under the specified reaction conditions failed:

(A) N-acryloyl-4-aminosalicylic acid (2.0 g.), azobisisobutyronitrile (50 mg.) and 50% v./v. aqueous ethanol (50 mg.) at 70° C. for 50 hours.

(B) N-acryloyl-4-aminosalicylic acid (100 mg.), ethanol (2.5 ml.) and an aqueous solution (2.5 ml.) of ammonium persulphate (20 mg.) at 70° C. for 48 hours.

(C) N-acryloyl-4-aminosalicylic acid (100 mg.) purged with nitrogen (20 minutes), benzoyl peroxide (50 mg.), and chloroform (1.0 ml.) at 75° C. for 18 hours, and (D) N-acryloyl-4-aminosalicylic acid (100 mg.) in ethylene glycol (6.0 ml.) irradiated with a Hanovia ultraviolet lamp (80 watt) for 40 hours.

EXAMPLE 3

Preparation of N-acryloyl-5-aminosalicylic acid

The procedure reported in Example 1 for preparing N-acryloyl-aminosalicylic acid was repeated using 5-aminosalicylic acid (40 g.) instead of the sodium 4-aminosalicylic to yield 25.8 g. of N-acryloyl-5-aminosalicylic acid melting at 218–219° C. and analysing as follows:

Calculated.—$C_{10}H_9O_4N$ (percent): C, 58.0; H, 4.35; N, 6.76. Found (percent): C, 57.5; H, 4.5; N, 6.5.

Polymerisation of borate-complexed N-acryloyl-5-aminosalicylic acid

The procedure reported in Example 1 for polymerising borate-complexed N-acryloyl-4-aminosalicylate was repeated using N-acryloyl-5-aminosalicylic acid prepared as above instead of N-acrcyloyl-4-aminosalicylic acid to yield a pink polymeric precipitate. This precipitate was treated in the manner described in Example 1 to yield poly(N-acryloyl-5-aminosalicylic acid) and the borate complex thereof.

EXAMPLE 4

Polymerisation of titanium-complexed N-acryloyl-4-aminosalicylic acid

N-acryloyl-4-aminosalicylic acid (10 mg.) was suspended in 12.5% w./v. titanous chloride (100 ml.) and continuously stirred at room temperature for 20 minutes. After filtering at the pump, the solid was washed with distilled water (250 ml.) to produce a cream coloured solid titanium complex of the acid.

Titanium-complexed N-acryloyl-4-aminosalicylic acid (100 mg.) prepared as above was suspended in distilled water (100 ml.) to form a fawn coloured suspension and the pH of that suspension was adjusted to 9 with 10$N$ sodium hydroxide. It was noted that when the pH was first adjusted to 9 and then the suspension vigorously shaken the pH fell to 5. When the pH was constant at 9 the solid dissolved to form a coloured solution. Azobisisobutyronitrile (3 g.) in ethanol (40 ml.) was added and the solution heated at 80° C. for 48 hours on a water bath. The resultant solution was divided into two parts. The first part of the polymerised solution was dialysed against tap water for 24 hours and then 2$N$ hydrochloric acid added to precipitate an off-white coloured polymer.

The second part of the polymerised solution was acidified with 2$N$ hydrochloric acid to precipitate an off-white coloured polymer which was filtered off at the pump.

EXAMPLE 5

Polymerisation of titanium-complexed N-acryloyl-5-aminosalicyclic acid

The procedure reported in Example 4 for preparing titanium-complexed N-acryloyl-4-aminosalicylic acid was repeated using N-acryloyl-5-aminosalicylic acid instead of the N-acryloyl-4-aminosalicylic acid to yield a fawn coloured solid titanium complex.

The procedure reported in Example 4 for polymerising titanium complexed N-acryloyl-4-aminosalicylic acid was repeated using taitanium-complexed N-acryloyl-5-aminosalicylic acid prepared as above to yield a cream coloured polymer.

EXAMPLE 6

Polymerisation of N-acryloyl-4-aminosalicylic acid

N-acryloyl-4-aminosalicylic acid (1 g.) was suspended in distilled water (20 ml.) and the pH adjusted to 9 by addition of 10$N$ sodium hydroxide. Care was taken to ensure that the pH was constant at 9 because the phenoxide ion of salicyclic acid takes a little time to take up the sodium ions. Azobisisobutyronitrile (0.5 gm.) in ethanol (10 ml.) was added and the solution heated at 80° C. on a water bath for 48 hours. The resultant solution was divided into two parts.

The first part of the polymerised solution was dialysed against tap water for 24 hours then 2N hydrochloric acid added to precipitate a white flocular polymer.

The second part of the polymerised solution was acidified with 2N hydrochloric acid to precipitate a white polymer which was washed wtih distiled water (500 ml.) by decantation.

EXAMPLE 7

Polymerisation of N-acryloyl-5-aminosalicylic acid

The procedure of Example 6 was repeated using N-acryloyl-5-aminosalicylic acid to yield, after acidification of the polymerised solution (second part) and of the dialysed solution, a very pale pink flocular polymer.

EXAMPLE 8

Polymerisation of N-acryloyl-5-aminosalicylic acid

The procedure of Example 7 was repeated with the exception that the pH of the N-acryloyl-5-aminosalicylic acid suspension was adjusted to 4.5 by addition of the sodium hydroxide. After acidification of the polymerised solution (second part) and of the dialysed solution, a pink flocular polymer was obtained.

EXAMPLE 9

Polymerisation of N-acryloyl-4-aminosalicylic acid

The procedure of Example 6 was repeated with the following exceptions:

(1) the pH of the N-acryloyl-4-aminosalicylic acid suspension was adjusted to pH 4.5 by addition of the sodium hydroxide.

(2) 12.5 w./v. titanous chloride was added to the dialysed solution to precipitate a dark brown titanium complexed polymer which was washed with distilled water (100 ml.), and (3) 12.5% w./v. titanous chloride was added to the polymerised solution (second part) to precipitate a dark brown titanium complexed polymer which was washed with distilled water (100 ml.).

What is claimed is:

1. A method of polymerising by free-radical polymerisation an ethylenically unsaturated monomer having at least one pair of adjacent hydroxy and carboxylic acid groups defining chelating sites comprising the addition of at least one material selected from the group consisting of an inorganic chelating ion, a hydroxide of an alkali metal, a carbonate of an alkali metal, a hydroxide of ammonia and a carbonate of ammonia, and then conducting the free radical polymerisation at a pH of about 4.5 to about 9, said monomer being an orthohydroxybenzoic acid having as a ring substituent an ethylenically unsaturated radical of the formula $X \cdot (CO)_n \cdot CR = CR_1R_2$, wherein R, $R_1$ and $R_2$ each independently represents hydrogen, $C_1$–$C_6$ alkyl or halogen, $n$ represents 0 or 1 and X represents a direct bond, oxygen, sulphur, —NH— or methylene.

2. The method according to Claim 1 wherein $R_1$ and $R_2$ each represent hydrogen and R represents methyl or hydrogen.

3. The method according to Claim 2 wherein the monomer is selected from N-acryloyl-4-aminosalicylic acid and N-acryloyl-5-aminosalicylic acid.

4. The method according to Claim 1 wherein the monomer is chelated with titanous or borate ions.

5. The method according to Claim 1 wherein a chelate reactant is formed *in situ* immediately prior to free-radical initiation.

6. The method according to Claim 1 in which sufficient alkali is present in the reaction mixture to render that mixture about pH 9.

7. A method of polymerising by free-radical polymerisation an ethylenically unsaturated monomer having at least one pair of adjacent hydroxy and carboxylic acid groups defining chelating sites comprising at least one of the steps of (1) chelating the said monomer with an inorganic ion and conducting the free-radical polymerisation on the chelated monomer and (2) conducting the free-radical polymerisation in the presence of an alkali at a pH of greater than 7.0, said monomer being an orthohydroxybenzoic acid having as a ring substituent an ethylenically unsaturated radical of the formula $$X \cdot (CO)_n \cdot CR = CR_1R_2,$$

wherein R, $R_1$ and $R_2$ each independently represents hydrogen, $C_1$–$C_6$ alkyl or halogen, $n$ represents 0 or 1 and X represents a direct bond, oxygen, sulphur, —NH— or methylene.

8. The method according to Claim 7 wherein the free-radical polymerisation is conducted on the unchelated monomer.

9. The method according to Claim 7 wherein the free-radical polymerisation is conducted on the chelated monomer.

10. The method according to Claim 1 wherein the monomer is selected from N-acryloyl-4-aminosalicylic acid and N-acryloyl-5-aminosalicylic acid, the monomer is reacted with borax in aqueous solution to form a borate complex, the pH of the solution is adjusted to 9.0 with sodium hydroxide, and the complex is polymerised by heating with a free-radical initiator.

11. The method according to Claim 1 wherein the monomer is selected from N-acryloyl-4-aminosalicylic acid and N-acryloyl-5-aminosalicylic acid, the monomer is reacted with a suspension of titanous chloride to form a titanium complex, the pH of the solution is adjusted to 9.0 with sodium hydroxide, and the complex is polymerised by heating with a free-radical initiator.

References Cited

UNITED STATES PATENTS 2,961,426  11/1960  Engelhardt _____ 260—47 UA
3,290,270  12/1966  Goldberg _____ 260—47 UA

OTHER REFERENCES

Schildknecht, C. E.; Polymer Processes, Interscience Publishers (N.Y.), pp. 192, 193 (195).

JOSEPH A. SEIDLECK, Primary Examiner

C. A. HENDERSON, Jr., Assistant Examiner

U.S. Cl. X.R.

204—159.22; 260—80.3 N, DIG 1, DIG 4